US012192316B2

(12) United States Patent
Avikkal et al.

(10) Patent No.: US 12,192,316 B2
(45) Date of Patent: Jan. 7, 2025

(54) METHOD TO ELIMINATE CLOCK SYNCHRONIZATION FROM UNDESIRED CLOCK SOURCES

(71) Applicant: Cisco Technology, Inc., San Jose, CA (US)

(72) Inventors: Sreejith Avikkal, Ottawa (CA); Nancy Patricia Cam-Winget, Mountain View, CA (US); Lizbeth Berenice Guerra Martinez, Mexico City (MX); Natasha Wong, Torrance, CA (US); Jessica Lynne Poole, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

(21) Appl. No.: 17/558,313

(22) Filed: Dec. 21, 2021

(65) Prior Publication Data

US 2023/0198738 A1     Jun. 22, 2023

(51) Int. Cl.
*H04L 9/40*     (2022.01)
*H04L 7/10*     (2006.01)
*H04L 9/32*     (2006.01)

(52) U.S. Cl.
CPC .............. *H04L 7/10* (2013.01); *H04L 9/3247* (2013.01); *H04L 9/3297* (2013.01); *H04L 63/0876* (2013.01)

(58) Field of Classification Search
CPC ....... H04L 7/10; H04L 9/3247; H04L 9/3297; H04L 63/0876
See application file for complete search history.

(56) References Cited

U.S. PATENT DOCUMENTS

| 11,265,358 | B1 * | 3/2022 | Dellalyan | H04L 41/082 |
| 2012/0275501 | A1 * | 11/2012 | Rotenstein | H04J 3/0667 375/220 |
| 2013/0215889 | A1 * | 8/2013 | Zheng | H04J 3/0667 370/390 |

(Continued)

FOREIGN PATENT DOCUMENTS

| WO | WO2020064919 A1 | 4/2020 |
| WO | WO2021089607 A1 | 5/2021 |

OTHER PUBLICATIONS

Alghamdi et al., "Precision time protocol attack strategies and their resistance to existing security extensions", In the Proceedings of Cybersecurity, 4:12, Apr. 1, 2021, 17 pages.

*Primary Examiner* — Ghodrat Jamshidi
(74) *Attorney, Agent, or Firm* — Lee & Hayes, P.C.

(57) ABSTRACT

In one embodiment, methods for monitoring devices within a network by a controller are described. The method may include receiving a first request from a first device to authenticate a role of the first device as a grandmaster in a precision time protocol (PTP). Additionally, the method may include granting the first request designating the role of the first device as the grandmaster. The method may further include receiving a second request from a second device to authenticate that a clock announce message is from an authorized grandmaster. Additionally, the method may include determining whether the first device is authorized to send the clock announce message to the second device and, based on the determining, sending a message granting or denying permission for the first device to sync with the second device.

20 Claims, 10 Drawing Sheets

(56) References Cited

U.S. PATENT DOCUMENTS

| | | | |
|---|---|---|---|
| 2013/0227008 A1* | 8/2013 | Yang | H04J 3/0667 |
| | | | 709/204 |
| 2015/0154136 A1* | 6/2015 | Markovic | G06F 21/44 |
| | | | 710/317 |
| 2017/0134499 A1* | 5/2017 | Moyer | H04N 21/43076 |
| 2017/0134792 A1* | 5/2017 | Moyer | H04N 21/2146 |
| 2017/0214479 A1* | 7/2017 | Heine | H04J 3/0667 |
| 2019/0007151 A1* | 1/2019 | Goel | H04W 56/0015 |
| 2020/0322075 A1 | 10/2020 | Bhandari et al. | |
| 2021/0092646 A1* | 3/2021 | Polehn | H04L 43/0858 |
| 2021/0152323 A1 | 5/2021 | Sakaue | |
| 2021/0167941 A1* | 6/2021 | Yamaguchi | H04L 7/0016 |
| 2021/0181787 A1* | 6/2021 | Chan | G06F 1/10 |
| 2021/0211461 A1 | 7/2021 | Beardsley et al. | |
| 2021/0328697 A1* | 10/2021 | Budnik | H04L 12/40013 |
| 2023/0046743 A1* | 2/2023 | Vaez-Ghaemi | H04B 10/25759 |
| 2023/0059736 A1* | 2/2023 | Reddy | H04L 43/0852 |
| 2023/0060679 A1* | 3/2023 | Pustylnik | H04L 45/74591 |

\* cited by examiner

METHOD TO ELIMINATE CLOCK SYNCHRONIZATION FROM UNDESIRED CLOCK SOURCES

TECHNICAL FIELD

The present disclosure relates generally to the field of computer networking, and more particularly to assessing authenticity of clock sources, and managing synchronization of clock sources within a network.

BACKGROUND

Different types of clock synchronization techniques are used for synchronizing the clocks of devices connected to a network. Clock synchronization is an important aspect of ensuring proper functionality of a network. Different time/clock sources or protocols are known in the art and can be used to define how any node or device in a network can synchronize its clock. For example, clock synchronization may be performed using periodic exchange of timestamps between network devices and the time sources. In some protocols, the time sources form a hierarchy and time is distributed from top to bottom with the root of nodes on top synchronized to a reference time source (e.g. time signaled from GPS receiver). The nodes acting as a time source can be authenticated using encryption techniques (e.g., using a symmetric key and public key authentication schemes). However, identity authentication of a nodes serving as a time source may not be sufficient. The time source may have become compromised so that the time source may no longer be a trusted entity. A compromised time source can perpetuate harm to the entire network. Any applications relying on proper time synchronization to perform their tasks (e.g. verifying validity of a token and certificates that are time bound) are also likely to be compromised. There therefore exist needs for systems and methods of verifying the trustworthiness of time sources used by networks.

Moreover, when designing a network, it is common to have multiple Precision Time Protocol (PTP) grandmasters in a Wide-Area Network (WAN) in order to produce a robust network and improve reliability of clock synchronization within the network. For instance, currently a network device in the network elects a PTP master (which in turn may become a grandmaster) from IEEE 1588v2 based on various clock quality attributes. For example, under the current standard IEEE 1588v2, any PTP enabled device can participate in the master-slave election process. Further, the current standard IEEE 1588v2 does not include a mechanism to disable participation in the master-slave election process. This creates a threat of a rouge master attach on the network, where a rogue network device (e.g., compromised time source) acts as a grandmaster within the network. This can disrupt clocks and perpetuate harm to the entire network. As the network grows, the rogue master threat to network security also grows. There therefore exist a need for systems and methods of eliminating clock synchronization with undesired clock sources within a network.

Additionally, in some cases, an administrator of a service network may not want specific nodes within the service network to act as masters. In such situations, existing techniques enable administrators to restrict a particular node from acting as a master within the service network. However, there may be specific circumstances (e.g., such as when the administrator determines the particular node has a better time source and/or is a better driver of the time source, etc.), where the administrator may want the restricted node to act as a master. Under existing techniques, there is no way for the administrator to allow the restricted node to act as a master if certain conditions are met. Accordingly, there is a need for systems and methods to provide administrators greater control and management over clock synchronization within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
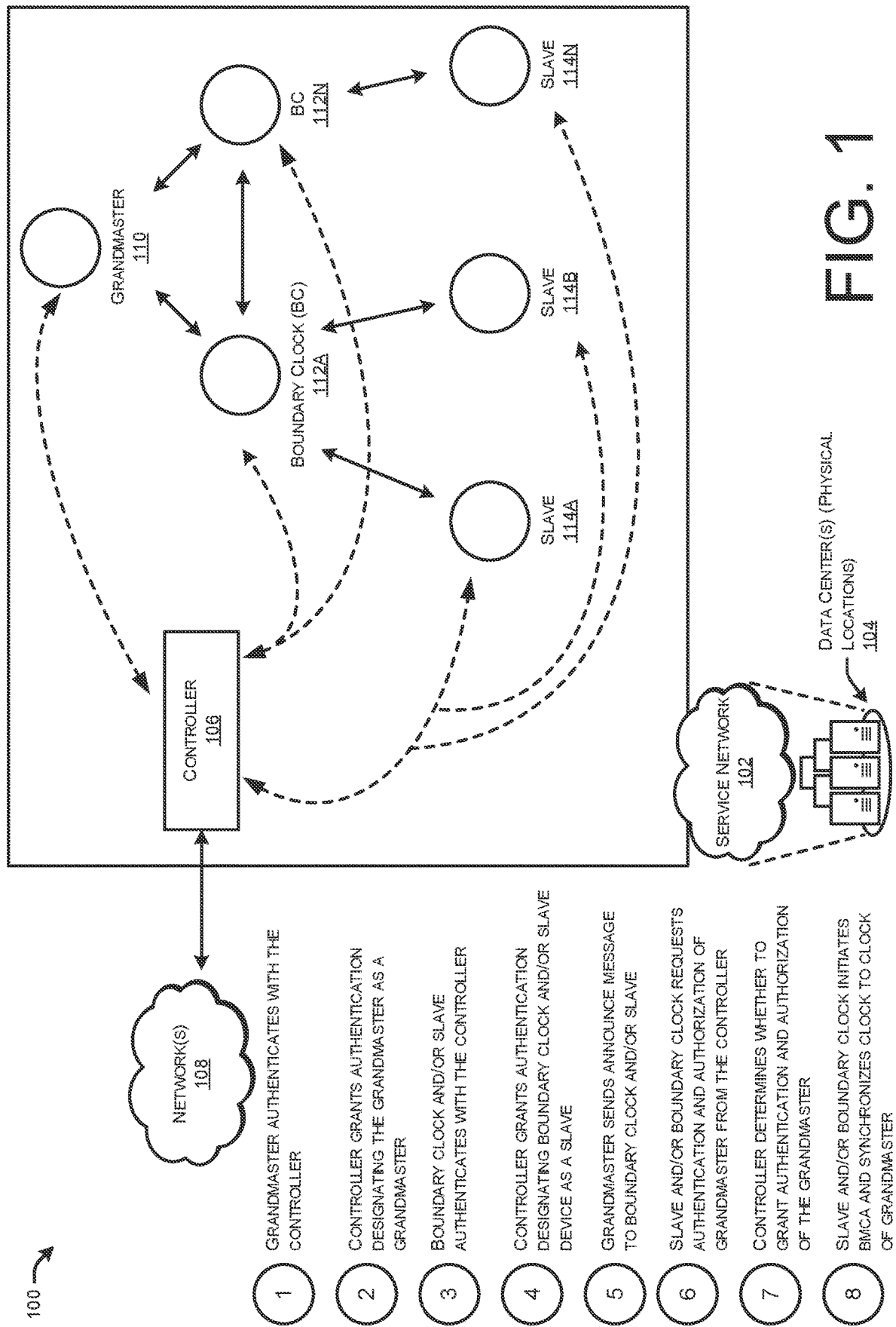
FIG. 1 illustrates a system-architecture diagram of an environment in which a controller monitors, authenticates, and authorizes clock synchronization between network devices.

The present disclosure relates generally to techniques for using a controller in a PTP system to monitor, authenticate, and authorize synchronization between network devices.

A method to perform techniques described herein may include receiving a first request from a first device to authenticate a role of the first device as a grandmaster in a precision time protocol (PTP). Further, the techniques include granting the first request designating the role of the first device as the grandmaster. Additionally, the techniques include receiving a second request from a second device to authenticate that a clock announcement from the first device is from an authorized grandmaster and determining whether the first device is authorized to send the clock announcement to the second device. The techniques further include in response to determining the first device is authorized to send the clock announcement, sending to the second device a message indicating that the first device is authorized as the grandmaster and granting permission for the second device to sync with the first device, or in response to determining that the first device is not authorized to perform the clock announcement, sending to the second device, a message indicating that the first device is not authorized as the grandmaster and denying permission for the second device to sync with the first device.

A system to perform techniques described herein may include sending an authentication request to a controller of a network to designate a role of the network device as a grandmaster in a PTP. The techniques further include receiving a grant of authentication from the controller designating the role the network device as the grandmaster. Additionally, the techniques include sending a clock announcement to a second device within the network. The techniques also include performing a best master clock algorithm (BMCA) with the second device to synchronize a clock of the second device with a clock of the network device.

Additionally, the techniques described herein may be performed by a system and/or device having non-transitory computer-readable media storing computer-executable instructions that, when executed by one or more processors, performs the method described above.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

While having numerous nodes can increase network connectivity and performance, it also increases security risks as each node that a packet traverses can introduce a risk of unauthorized data access and manipulation. For example, when a packet traverses a node, a security risk may be introduced which can result from the node being potentially compromised (e.g., hacked, manipulated, captured, etc.). Accordingly, as noted above, network data security is crucial in the field of computer networking.

Different types of clock synchronization techniques are used for synchronizing the clocks of devices connected to a network. Clock synchronization is an important aspect of ensuring proper functionality of a network. For instance, timing distribution to components of a multi-component communication system helps each component of the system to operate in synchronization with other components of the system, particularly when such the clock used by each component is synchronized to the other clocks. Clock synchronization protocols define how a node in a network or other communication system synchronizes its clock by periodically exchanging timing information messages with time sources. For example, PTP is a time synchronization protocol defined in IEEE 1588 for nodes distributed across a network. The fundamentals of PTP operation lies in two operations. First, PTP begins with election of master and slave between two nodes of the network to form a synchronization hierarchy. Next, PTP comprises continuous synchronization message exchange timestamps between master and slaves to ensure precise timing and synchronization at the slave. The variables influencing a device to elect the ports as a master or a slave are exchanged in announce messages between the nodes. The clock quality attributes are either local to each of the participating devices or an already elected grandmaster's property. Each node then runs the "best master clock algorithm" (BMCA), as described in IEEE1588v2-2008, section 6.6.2.3, which compares exchanged clock quality attributes to determine which node has the "better" clock.

When designing a network, it is common to have multiple PTP grandmasters in a WAN in order to produce a robust network and improve reliability of clock synchronization within the network. For instance, as noted above, a network device in a PTP network elects a PTP grandmaster (e.g., a grandmaster) from IEEE 1588v2 based on various clock quality attributes. For example, under the current standard IEEE 1588v2, any PTP enabled device can participate in the master-slave election process. Further, the current standard IEEE 1588v2 does not include a mechanism to disable participation in the master-slave election process. This creates a threat of a rouge master attach on the network, where a rogue network device (e.g., compromised time source) acts as a grandmaster within the network. For instance, a rogue device and/or rogue node within the network can include clock quality attributes in announce messages, such that the rogue device becomes a master and/or grandmaster within the network. This results in the clocks of the network synchronizing to a false time, as well as introduces a compromised time source to the network, which can perpetuate harm to the entire network. Any applications relying on proper time synchronization to perform their tasks (e.g. verifying validity of a token and certificates that are time bound) are also likely to be compromised. This can disrupt clocks and perpetuate harm to the entire network. As the network grows, the rogue master threat to network security also grows. There therefore exist a need for systems and methods of eliminating clock synchronization with undesired clock sources within a network.

Additionally, in some cases, an administrator of a service network may not want specific nodes within the service network to act as masters. In such situations, existing techniques enable administrators to restrict a particular node from acting as a master within the service network. However, there may be specific circumstances (e.g., such as when the administrator determines the particular node has a better time source and/or is a better driver of the time source, etc.), where the administrator may want the restricted node to act as a master. Under existing techniques, there is no way for the administrator to allow the restricted node to act as a master if certain conditions are met. Accordingly, there is a need for systems and methods to provide administrators greater control over clock synchronization within a network.

This disclosure describes techniques and mechanisms for enabling a controller to monitor, authenticate, and/or authorize clock synchronization between network devices in a system that implements PTP. For instance, the techniques may comprise authenticating a first device as a grandmaster in a PTP, authenticating the second device as a slave, receiving an authentication and authorization request from the slave based on an announce message from the grandmaster to the slave, determining whether to grant authentication and authorization of the grandmaster. Additionally, this disclosure describes techniques for network device(s) to authenticate with a controller of a network and synchronize time sources with other devices within the network. In this way, a controller of a service network can not only authenticate that a network device can act in a particular role (e.g., grandmaster, master, slave, etc.), but also that the network device itself is in a secure and trustworthy time source.

In some examples, authenticating the first device as a grandmaster includes receiving an authentication request from the first device. The authentication request may comprise one or more attributes associated with the first device. The attributes may comprise a client ID of the first device, a role requested by the first device, security attributes of the first device, clock quality attributes of the first device, among other attributes. In some examples, the authentication request is sent to the controller via a secured communication channel. For instance, transport layer security (TLS) protocol may be used and the authentication request may be sent from the first device to the controller via a TLS tunnel. In some examples, controller sends a message indicating a grant of authentication designating the role of the first device as a grandmaster. The grant of authentication message may comprise a private key and may be sent to the grandmaster (e.g., first device) over a secure communication channel (e.g. a TLS tunnel). The private key may be encrypted using an encryption protocol such as AESKeywrap. Additionally, or alternatively, any cipher suite algorithm and/or crypto agility may be used to generate a signature for an announce message by the grandmaster. The grandmaster (e.g., first device) may use the private key to encrypt one or more portions of the announce message (e.g., such as the TLV and/or a signature within the TLV) when sending an announce message to one or more network devices.

In some examples, the grandmaster includes the private key in the secured announce message sent to slave device(s) within the network. For instance, the secured announce message may comprise a TLV, which may include a proof of integrity. The TLV may be, for example, provided for in a standard as a future enhancement portion of an operational message, such as a future enhancement portion of a WAN message formatted according to a PTP communication protocol, as defined in one or more ITU standards.

In some examples, the TLV may comprise metadata elements containing security measurements or evidence can be used to provide verifiable evidence of device trustworthiness (e.g., such as a signature). The metadata elements can include applicable data for verifying trustworthiness of a network device and be provided through an applicable technique for verifying device trustworthiness. For example, the metadata elements can be provided as part of the proof of integrity (e.g., via a Canary stamp associated with the device, where the Canary stamp can indicate or otherwise include a signed measurement associated with the network device for verifying trustworthiness of the device), a hardware fingerprint, a SUDI of the source device, or an attestation key.

In some examples, the controller comprises maintains a permitted pool of client ID's associated with authenticated network devices. The permitted pool may also comprise authorized roles (e.g., grandmaster, master, and/or slave) associated with each client ID and/or clock ID's associated with each client ID. In some examples, the controller is configured to access threshold(s) (e.g., clock quality threshold(s)) associated with clock quality attributes, such as clock class, clock accuracy, clock variance, etc. The clock quality threshold(s) may be set by an administrator of the system. In some examples, the controller is configured to execute an algorithm to determine whether to authenticate and/or authorize a network device.

In this way, a controller of a service network can not only authenticate that a network device is acting in a permitted role (e.g., grandmaster, master, slave, etc.), but also that the network device itself is in a secure and trustworthy time source. Moreover, by implementing a controller within a PTP system, administrators of the service network will have more control over which nodes act as masters and under what circumstances. By ensuring that the time source is secure and providing greater administrator control and management, the techniques described herein improve network security and reduce harm to the network and applications that rely on the time source being accurate, such as by preventing rogue master attacks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which a controller 106 monitors, authorizes, and/or authenticates clock synchronization between various nodes. For instance, the illustrated environment 100 may represent a system that implements PTP.

In some examples, the environment 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

In some instances, the controller 106 comprises a network device and is included as part of a service network 102. In some examples, the controller 106 comprises a PTP aware network device. In other examples, the controller 106 comprises a PTP unaware device. The service network 102 may generally include, manage, or otherwise be associated with one or more applications or services utilized by users accessing network(s) 108. Network(s) 108 may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may provide any type of application or service for use by users of client devices (not shown). However, in other instances the controller 106 may be associated with any type of computing device and be used for any purpose. In some examples, controller 106 comprises a router, a switch, or any other type of device included in a network architecture.

As illustrated, the controller 106 communicates with various nodes within the service network 102. For instance, the nodes within the service network 102 may implement PTP. As described above, PTP is a time synchronization protocol for nodes distributed across a network. In some examples, a PTP system can consist of a combination of PTP and non-PTP devices. PTP devices may include ordinary clocks and boundary clocks. Non-PTP devices may include ordinary network switches, routers, and other devices included in a network architecture. PTP is a distributed protocol that specifies how real-time PTP clocks in the system synchronize with each other. These clocks are organized into a master-slave synchronization hierarchy with the grandmaster clock, which is the clock at the top of the hierarchy, determining the reference time for the entire system. Synchronization is achieved by exchanging PTP timing messages, with the members using the timing information to adjust their clocks to the time of their master in the hierarchy. Accordingly, FIG. 1 illustrates and exemplary master-slave hierarchy between nodes of a service network 102.

As illustrated, the controller 106 may communicate with one or more grandmaster(s) 110, boundary clock(s) 112, and/or slave(s) 114 within the service network 102. A grandmaster 110 (also referred to as a grandmaster network device 110 herein) may comprise any network device, such as a router, a switch, or any other type of device included in a network architecture. In some examples, the grandmaster 110 may comprise an ordinary clock (e.g., a device with a single network connection, such as communicating with the network 108 based on a single physical port). The grandmaster 110 may be a "master" to multiple other devices within the service network 102. For instance, as illustrate, the grandmaster 110 is a master to the boundary clocks 112A-112N. As used herein, "master" refers to a device that is the source for a clock synchronization, such that another device's (e.g., a slave device) time source is synchronized to the time source of the master.

A boundary clock 112 (also referred to as a boundary clock network device 112 herein) may comprise any network device, such as a router, a switch, or any other type of device included in a network architecture. In some examples, a boundary clock 112 may comprise a device with multiple connections to a network, such as via several physical ports. Each port of a boundary clock 112 shares a local clock, and the clock data sets are common to all ports. Each port decides its individual state, either master (synchronizing slave(s) 114 to the boundary clock's 112 time source) or slave (e.g., such as synchronizing to grandmaster 110), based on the best clock available to it through all of the other ports on the boundary clock. Messages that are related to synchronization and establishing the master-slave hierarchy terminate in the protocol engine of a boundary clock and are not forwarded. Each boundary clock 112A-112N is a "slave" to the grandmaster 110, such that the time source of each boundary clock follow (e.g., are synchronized to) the time source of grandmaster 110. In some examples, one or more of the boundary clock(s) 112 comprise PTP aware network devices. In some examples, one or more of the boundary clock(s) 112 comprise a PTP unaware devices. While FIG. 1 is illustrated as including boundary clock(s) 112, it is understood that in some PTP systems, boundary clock(s) 112 may not be used. In this example, ordinary clocks are connected to a single network, a grandmaster 110 is elected and all other clocks synchronize directly to the grandmaster 110.

A slave 114 (also referred to as a slave network device 114 herein) may comprise any network device, such as a router, a switch, or any other type of device included in a network architecture. As used herein, "slave" 114 comprises a device that is a destination for a synchronization reference (e.g., the time source of the slave 114 follows a time source of a master device). In some examples, one or more of the slave(s) 114 comprise PTP aware network devices. In some examples, one or more of the slave(s) 114 comprise a PTP unaware devices. In some examples, one or more of the slave(s) 114 may comprise ordinary clocks.

At "1", the controller 106 may receive a request to authenticate a network device, as a grandmaster network device 110. As described above, the controller 106 may receive the authentication request from a network device requesting a role of grandmaster 110. The authentication request may be received via a secured communication channel, such as a TLS tunnel. In some examples, the additional authentication requests are embedded in a TLV of any interior or exterior gateway protocols. The authentication request may comprise a client ID associated with the network device, a requested role (e.g., grandmaster 110), clock quality attributes (e.g., clock accuracy, clock accuracy, clock variance, etc.), and/or other attributes associated with the network device. In some examples, the attributes may further comprise security attributes associated with the network device. In some examples, the authentication request may comprise a clock ID and/or client ID associated with the network device.

At "2", the controller 106 may grant authentication designating a role of the network device as a grandmaster 110. For instance, as described above, the controller 106 may record the client ID and/or clock ID and determine that the client ID and/or clock ID is included in a list of permitted grandmaster devices. Additionally, the controller 106 may determine whether the security posture of the network device meets the requirements of becoming a grandmaster 110. For instance, the controller 106 may evaluate the security posture of the network device based on (1) whether there are any security vulnerabilities and/or programs of concern associated with the network device, (2) a location (physical and/or network domain) of the network device (e.g., whether the location is vulnerable), and/or (3) device type (e.g., cell phone, switch, router, etc.) of the network device.

In some examples, such as where the security posture of the network device meets the requirements of grandmaster 110, the controller 106 may grant authentication. In response, the controller may store the grandmaster network device client ID, role as grandmaster, and security attributes associated with the grandmaster network device 110. The controller 106 may send the network device a message indicating a grant of authentication as a grandmaster 110. In some examples, the grant of authentication message is sent to the grandmaster 110 via a secured communication channel, such as a TLS tunnel. In some examples, the response from the controller 106 may be based on the request type (e.g., TLS versus gateway protocol(s)). In some examples, the authentication message comprises a private key. In some examples, the private key is encrypted using a AESKeywrap protocol. As described above, the private key may be used by the grandmaster 110 to sign announce messages to other network devices.

At "3" the controller 106 may receive additional authentication requests to authenticate additional devices, such as boundary clock(s) 112 and/or slave(s) 114. As noted above, the additional authentication request(s) may be received via secured communication channel(s), such as TLS tunnels. In some examples, the additional authentication requests are embedded in a TLV of any interior or exterior gateway protocols. The additional authentication request(s) may comprise client ID(s) associated with the additional device(s), clock ID(s) associated with the additional device(s), role(s) requested by the additional device(s), and/or clock quality attributes associated with the additional device(s). As noted above, the boundary clock(s) 112 and/or slave(s) 114 may comprise any network device, such as a router, a switch, or any other type of device included in a network architecture. In some examples, the boundary clock(s) 112 and/or slave(s) 114 may comprise PTP aware network devices.

At "4", the controller grants authentication designating the boundary clock 112 and/or slave 114 as a slave device 114. As described above, the controller 106 may record the client ID and/or clock ID and determine that the client ID and/or clock ID is included in a list of permitted slave devices. Additionally, the controller 106 may determine whether the security posture of the additional device(s) meet the requirements of becoming a slave 114. For instance, the controller 106 may evaluate security posture(s) of the additional device(s) based on (1) whether there are any security vulnerabilities and/or programs of concern associated with the network device, (2) a location (physical and/or network domain) of the network device (e.g., whether the location is vulnerable), and/or (3) device type (e.g., cell phone, switch, router, etc.). In some examples, the security posture required to become a master and/or slave 114 may be different than the security posture required to become a grandmaster 110. Accordingly, a device that may not have the security posture to become a grandmaster 110 may still be eligible to be a master and/or slave 114. In this way, the controller 106 may establish a trusted relationship with each PTP aware device within the service network 102.

In some examples, such as where the security posture(s) of the additional device(s) meet the requirements of a slave 114, the controller 106 may grant authentication. For instance, as described above, the controller 106 may store the client ID and/or clock ID, role as slave, clock quality attribute(s), and/or security attributes associated with the slave 114. The controller 106 may send the network device a message indicating a grant of authentication as a slave 114. In some examples, the grant of authentication message is sent to the slave 114 via a secured communication channel, such as a TLS tunnel. In some examples, the grant of authentication message may comprise a public key. The public key may be encrypted using AESKeywrap protocol. The public key may be used by the slave 114 to decrypt an announce message from a grandmaster 110.

At "5", the grandmaster 110 sends an announce message to one or more boundary clock(s) 112 and/or slave device(s) 114 within the service network 102. The announce message may comprise a clock ID of the grandmaster 110, clock quality attributes (e.g., clock class, clock accuracy, clock variance, etc.) of the grandmaster 110, and a TLV. In some examples, the announce message comprises a new message type or old announce message with reserved bits indicating the presence of TLV. As described above, the TLV may comprise a signature. The signature may comprise a proof of integrity and may be generated using a private key, one or more cipher suite algorithms, and/or crypto agility. The announce message may be sent via a secured communication channel, such as TLS tunnel.

At "6", the controller 106 receives an authentication and authorization request from a slave device 114 and/or boundary clock 112. The authentication and authorization request may comprise a clock ID and/or client ID of the grandmaster 110, the attribute(s) (e.g., clock quality attributes, security attributes, etc.) of the grandmaster, and the TLV from the grandmaster's announce message. In some examples, the authentication and authorization request may comprise a client ID and/or additional attribute(s) (clock quality, security, etc.) associated with the slave device 114.

At "7", the controller 106 determines whether to grant authentication and authorization of the grandmaster 110. As noted above and described in greater detail below with regard to FIG. 6, the controller 106 may run an algorithm (e.g., controller algorithm) to determine whether to authenticate the grandmaster 110 and authorize clock synchronization between the grandmaster 110 and the slave 114. Where the controller 106 determines that the grandmaster 110 is authenticated, the controller 106 may send a grant of authorization message to the slave 114 indicating the slave is authorized to perform clock synchronization with the grandmaster 110.

At "8", the boundary clock 112 and/or slave device 114, in response to receiving the authorization from the controller 106, runs the BMCA in order to synchronize it's clock to the clock of the grandmaster 110.

In some examples, the controller 106 may send a public key to the slave 114 in response to authenticating the grandmaster 110, as described above at "2." In this example, the slave 114 may use the public key to authenticate the grandmaster 110, without the need to perform steps 4, 6, and 7 described above. In this example, the slave 114 may authenticate the grandmaster 110 by using the public key to decrypt and validate the signature in the announce message sent by the grandmaster 110.

Figure 2:
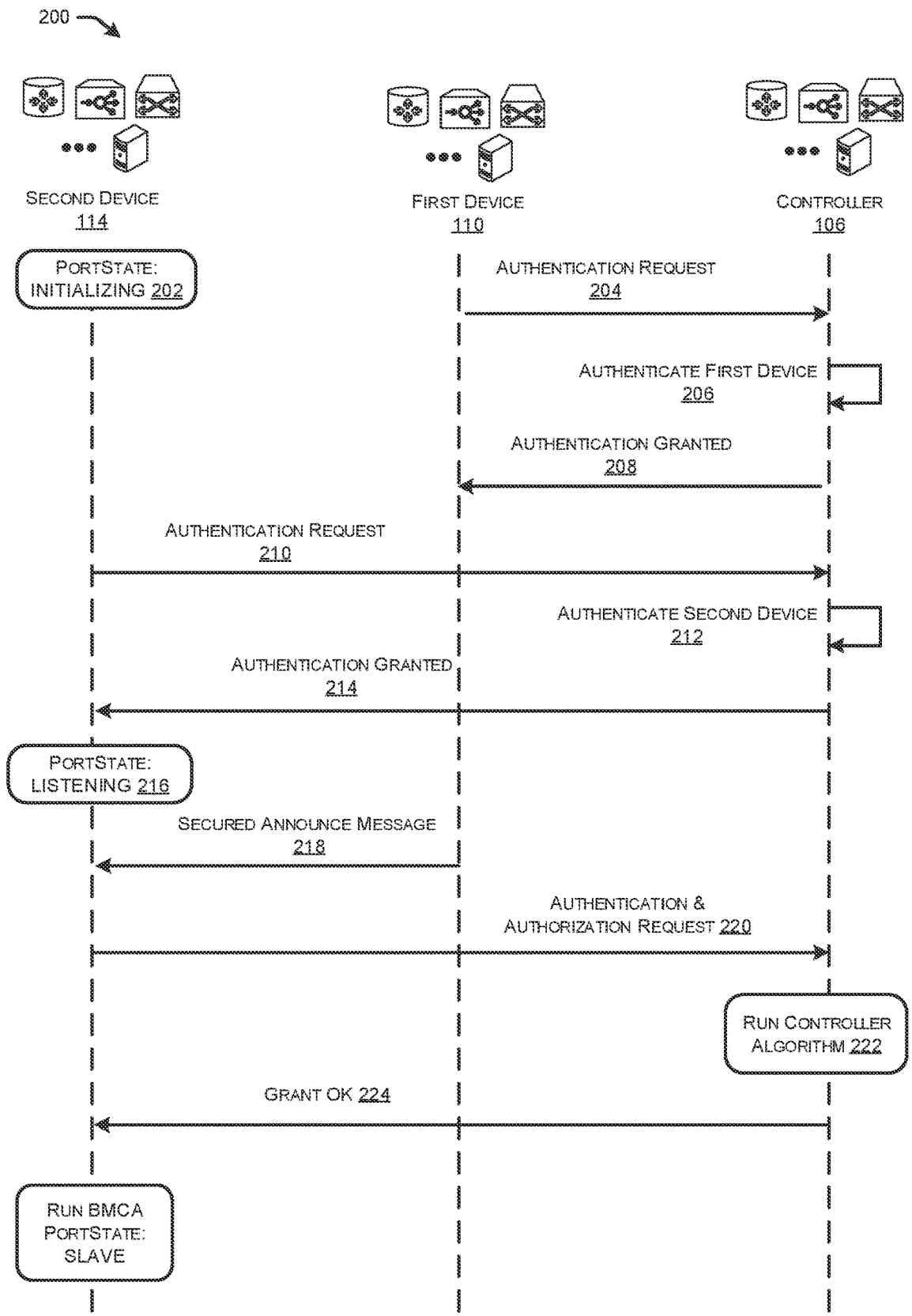
FIG. 2 illustrates a flow diagram of example communications where the controller grants authorization to synchronize clocks between network devices.

FIG. 2 illustrates a flow diagram of an example communication session 200 for granting authorization to synchronize clocks between one or more network devices.

As illustrated, the communication session comprises a controller 106, a first device 110, and a second device 114. As described above, the controller 106 comprises any network device. In some examples, the controller 106 comprises a PTP aware network device. In other examples, the controller 106 comprises a PTP unaware device. As illustrated, the first device 110 corresponds to a grandmaster network device 110. As described above, the grandmaster network device 110 may comprise an ordinary clock (e.g., a device with a single network connection, such as communicating with the network 108 based on a single physical port). As illustrated, the second device 114 comprises a slave device 114. As described above, the slave device 114 may comprise an ordinary clock and/or a boundary clock 112. In the illustrative example, the first device 110 and the second device 114 comprise PTP aware devices.

At 202, the second device 114 sets it's PortState as "INITIALIZING." In "initializing" mode, the port of the second device 114 is initializing it's connection to the network 108 and/or service network 102.

At 204, the first device 110 sends an authentication request to the controller 106. As described above, the authentication request may be sent via a secured communication channel, such as a TLS tunnel. In some examples, the authentication request is embedded in a TLV of any interior or exterior gateway protocols. The authentication request may comprise a client ID and/or clock ID associated with the first device 110, a requested role (e.g., grandmaster 110), and/or attributes associated with the first device 110. The attributes may comprise clock quality attributes of the first device (e.g., clock accuracy, clock accuracy, clock variance, etc.). The attributes may further comprise security attributes associated with the first device 110.

At 206, the controller 106 authenticates the first device 110. For instance, as noted above, the controller 106 may access a list of devices permitted to act as grandmasters within the service network. In some examples, the controller 106 may authenticate the first device 110 based on accessing a list of roles the first device 110 is authorized to perform. Additionally or alternatively, the controller 106 may authenticate the first device 110 based on evaluating a security posture of the first device 110. For instance, the controller 106 may check that the security posture of the first device 110 meets the requirements to be a grandmaster. For instance, the controller 106 may evaluate the security posture of the first device 110 based on (1) whether there are any security vulnerabilities and/or programs of concern associated with the first device, (2) a location (physical and/or network domain) of the first device (e.g., whether the location is vulnerable), and/or (3) device type (e.g., cell phone, switch, router, etc.) of the first device. In some examples, such as where the security posture of the first device 110 meets the requirements of a grandmaster, the controller 106 may grant authentication. In response, the controller 106 may store the client ID and/or clock ID, role as grandmaster, and security attributes associated with the first device 110.

At 208, the controller 106 sends a message to the first device 110 indicating that authentication has been granted designating the first device 110 as a grandmaster. In some examples, the grant of authentication message is sent to the first device 110 via a secured communication channel, such as a TLS tunnel. In some examples, the response from the controller 106 may be based on the request type (e.g., TLS versus gateway protocol(s)). In some examples, the grant of authentication message comprises a private key. In some examples, the private key is encrypted using a AESKeywrap protocol. As described above, the private key may be included by the first device 110 in announce message(s) to other network devices.

At 210, the second device 114 sends an authentication request to the controller 106. As noted above, the authentication request may be sent via secured communication channel(s), such as TLS tunnels. In some examples, the authentication request may be embedded in a TLV of any interior or exterior gateway protocols. The authentication request may comprise a client ID and/or clock ID associated with the second device 114, a requested role (e.g., such as slave), and/or clock quality attributes associated with the second device 114. The authentication request may further comprise security attributes associated with the second device 114.

At 212, the controller 106 authenticates the second device 114. For instance, as noted above, the controller 106 may access a list of devices permitted to act as slaves within the service network 102. In some examples, the controller 106 may authenticate the second device 114 based on accessing a list of roles the second device 114 is authorized to perform. Additionally or alternatively, the controller 106 may authenticate the second device 114 based on evaluating a security posture of the second device 114. For instance, the controller 106 may check that the security posture of the second device 114 meets the requirements to be a slave. In some examples, the controller 106 may evaluate the security posture of the second device 114 based at least in part on the security attributes of the second device 114.

In some examples, such as where the security posture of the second device 114 meets the requirements of a slave, the controller 106 may grant authentication. In response, the controller 106 may store the client ID and/or clock ID, role as slave, and security attributes associated with the second device 114.

At 214, the controller 106 sends a message to the second device 114 indicating that authentication has been granted designating the second device as a slave 114. In some examples, the grant of authentication message is sent to the second device 114 via a secured communication channel, such as a TLS tunnel. In some examples, the authentication grant message comprises a public key. The public key may be encrypted using any encryption protocol (e.g., symmetric cryptography, public key cryptography, AESKeywrap protocol, etc.). The public key may be used by the second device 114 to decrypt an announce message from a grandmaster. While steps 210, 212, and 214 are described as occurring while the PortState is "INITIALIZING," it is understood that steps 210, 212, and 214 may occur while the PortState is set to "LISTENING" (e.g., is in a listening state).

At 216, in response to receiving the authentication from the controller 106, the second device 114 changes it's PortState to "LISTENING." In "listening" mode, the port of the second device 114 is waiting for a connection to be formed and is "listening" for an announce message from another device.

At 218, the second device 114 receives a secured announce message from the first device 110. As described above, the secured announce message may comprise a clock ID of the first device 110, clock quality attributes (e.g., clock class, clock accuracy, clock variance, etc.) of the first device 110, and a TLV. In some examples, the announce message comprises a new message type or old announce message with reserved bits indicating the presence of TLV. As described above, the TLV may comprise metadata elements, such as a proof of integrity. For instance, the TLV may comprise a signature. The signature may be generated using one or more cipher suite algorithms and/or crypto agility. In some examples and as noted above, the proof of integrity may comprise a Canary stamp, a hardware fingerprint, a SUDI of the source device, or an attestation key. In some examples, the announce message may be sent via a secured communication channel, such as TLS tunnel.

At 220, the controller 106 receives an authentication and authorization request from the second device 114. As described above, the authentication and authorization request may comprise a client ID and/or clock ID associated with the first device 110, attribute(s) of the first device 110 (e.g., comprise clock quality attributes and/or security attributes), and/or a TLV. In some examples, the authentication and authorization request may comprise a client ID and/or additional attribute(s) (clock quality, security, etc.) associated with the second device 114.

At 222, the controller 106 runs (e.g., executes) the controller algorithm to determine whether to authenticate the grandmaster 110 and authorize the second device 114 to synchronize clocks with the grandmaster 110. Where the controller 106 determines to grant authorization to the second device 114, the controller 106 may send a grant of authorization message to the second device 114 indicating the slave is authorized to perform clock synchronization with the first device 110.

At 224, the second device 114 receives a message from the controller 106 granting authorization for the second device 114 to synchronize with the clock of the first device 110. As described above, in response to receiving the grant of authorization message, the second device 114 may initiate the BMCA. Additionally, the second device 114 may set it's PortState to "SLAVE" based on the outcome of the BMCA.

Figure 3:
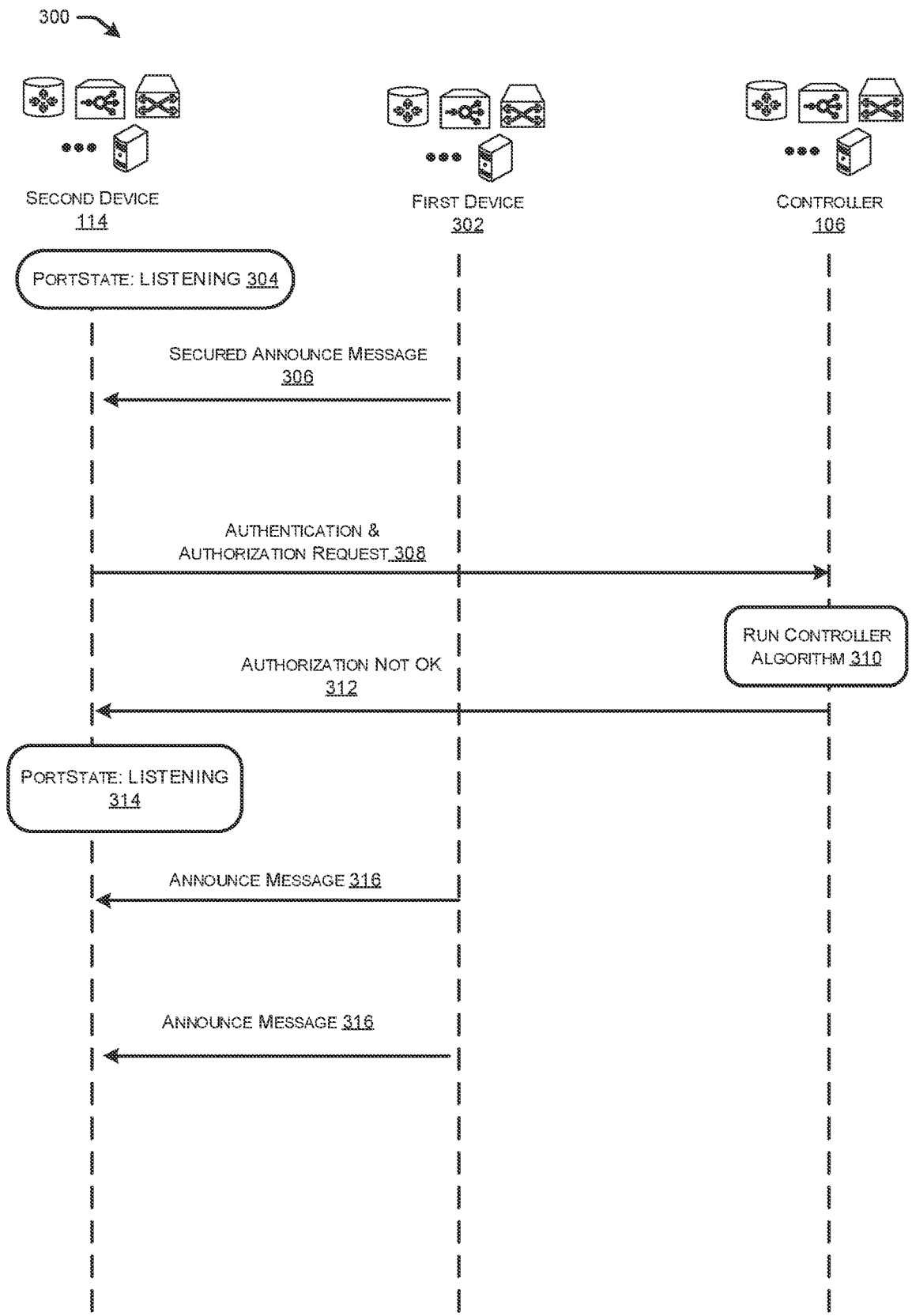
FIG. 3 illustrates a flow diagram of example communications where the controller denies authorization to synchronize clocks between network devices.

FIG. 3 illustrates a flow diagram of an example communication session 300 for denying authorization to synchronize clocks between network devices. As illustrated, the controller 106 may communicate with a second device 114, such as a slave device 114 described above. In the illustrative example, the second device 114 comprises a PTP aware device that is authenticated by the controller 106 using the techniques described above. As illustrated, the first device 302 may comprise a rogue device 302 that introduced to the service network 102 and is attempting to act as a grandmaster 110. For instance, the first device 302 may correspond to a rogue master device attempting to attack the service network 102. In some examples, the first device 302 may comprise a PTP unaware device, such that the first device 302 has not been authenticated by the controller 106 and an administrator of the service network 102 has not manually added information associated with the first device 302 to list(s) (e.g., list of permitted device(s), list of authenticated device(s), list of device(s) permitted to perform various role(s), etc.) maintained by the controller 106.

At 304, the second device 114 sets it's PortState to "LISTENING." As noted above, in "listening" mode, the port of the second device 114 is waiting for a connection to be formed and is "listening" for an announce message from another device.

At 306, the second device 114 receives a secured announce message from the first device 302. As described above, the secured announce message may be sent via a secured channel, and may comprise a client ID and/or clock ID associated with the first device 302 and attributes (e.g., clock quality attributes, security attributes, etc.) associated with the first device 302. In some examples, the announce message may comprise a TLV, as described above.

At 308, the controller 106 receives an authentication and authorization request from the second device 114. As noted above, the authentication and authorization request may comprise the client ID, clock ID, and/or clock quality attribute(s) associated with the first device 302. In some examples and as described above, the authentication and authorization request may comprise a TLV. In some examples, the authentication and authorization request may comprise a client ID and/or additional attribute(s) (clock quality, security, etc.) associated with the second device 114.

At 310, the controller 106 runs (e.g., executes) the controller algorithm. The controller algorithm is described in greater detail below with regard to FIG. 6. Based at least in part on running the controller algorithm, the controller 106 may determine that the first device 302 is not authenticated and/or is not authorized to act as a grandmaster within the service network 102.

At 312, the second device 114 receives a message from the controller 106. The message may comprise an indication that the first device 302 is not authenticated and/or that authorization for the second device 114 to synchronize clocks with the first device 302 is denied.

At 314, the second device 114 maintains it's PortState as "LISTENING." As noted above, in "listening" mode, the port of the second device 114 is waiting for a connection to be formed and is "listening" for an announce message from another device.

At 316, the second device 114 receives one or more announce message(s) from the first device 302. In this example, the second device 114 ignores the announce message(s) from the first device 302 based on receiving the denial of authorization message from the controller at step 314. For instance, the second device 114 may maintain a list of non-authorized master and/or grandmasters 110. When the second device 114 receives an announce message from a master and/or grandmaster included in the list, the second device may ignore the announce message. In this way, the techniques and methods described herein prevent rogue master threats and/or man in the middle attacks to a service network 102, thereby improving network security.

Figure 4:
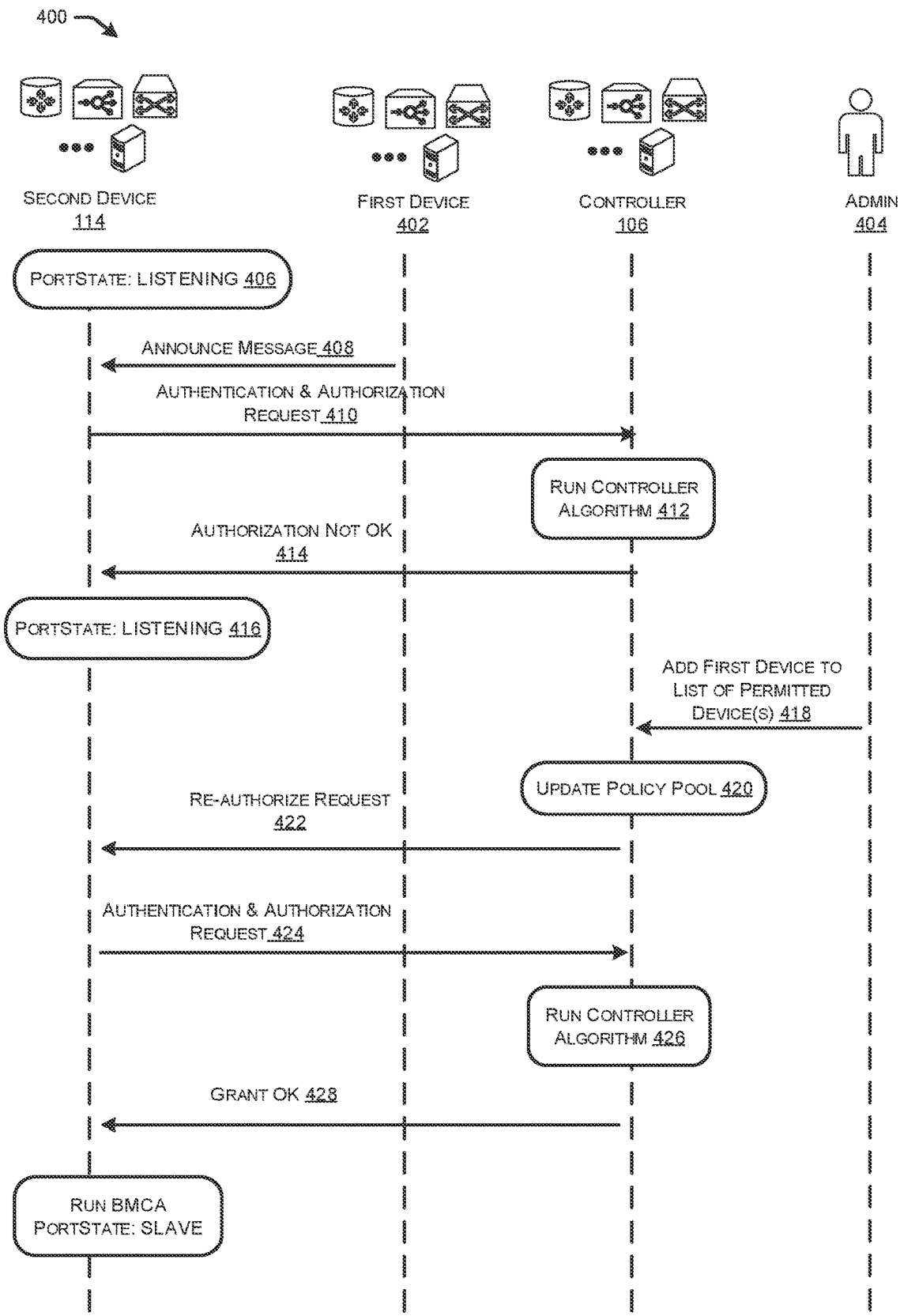
FIG. 4 illustrates a flow diagram of example communications where the controller re-authorizes a network device and grants authorization to synchronize clocks between network devices in response to an administrator input.

FIG. 4 illustrates a flow diagram of an example communication session 400 for re-authorizing a network device in response to input by an administrator 404. As illustrated, the controller 106 may communicate with a second device 114, such as a slave device 114 described above. In the illustrative example, the second device 114 comprises a PTP aware device that is authenticated by the controller 106 using the techniques described above. As illustrated, the first device 402 may comprise a PTP unaware device, such that the first device 402 has not been authenticated by the controller 106.

At 406, the second device 114 sets it's PortState to "LISTENING." As noted above, in "listening" mode, the port of the second device 114 is waiting for a connection to be formed and is "listening" for an announce message from another device.

At 408, the second device 114 receives an announce message from the first device 402. As described above, the announce message may comprise a client ID and/or clock ID associated with the first device 402 and attribute(s) (e.g., clock quality attributes, security attributes, etc.) associated with the first device 402.

At 410, the controller 106 receives an authentication and authorization request from the second device 114. As noted above, the authentication and authorization request may comprise the client ID, clock ID, and/or clock quality attribute(s) associated with the first device 402. In some examples, the authentication and authorization request may comprise a client ID and/or additional attribute(s) (clock quality, security, etc.) associated with the second device 114.

At 412, the controller 106 runs (e.g., executes) the controller algorithm. The controller algorithm is described in greater detail below with regard to FIG. 6. Based at least in part on running the controller algorithm, the controller 106 may determine that the first device 402 is not authenticated and/or is not authorized to act as a grandmaster within the service network 102.

At 414, the second device 114 receives a message from the controller 106. The message may comprise an indication that the first device 402 is not authenticated and/or that authorization for the second device 114 to synchronize clocks with the first device 402 is denied.

At 416, the second device 114 maintains its PortState as "LISTENING." As noted above, in "listening" mode, the port of the second device 114 is waiting for a connection to be formed and is "listening" for an announce message from another device. In the illustrative example, the second device 114 may maintain a list of non-authorized master and/or grandmasters 110. For instance, in response to receiving the denial of authorization message from the controller 106 at 414, the second device 114 may update the list of non-authorized masters and/or grandmasters to include the clock ID and/or client ID of the first device 402. Accordingly, when the second device 114 receives any subsequent announce message from the first device 402, the second device 114 may ignore the announce message.

At 418, an administrator 404 may add information associated with the first device 402 to a list (e.g., permitted pool) of authenticated devices. For instance, the administrator 404 may update the list(s) of the controller 106 to comprise a client ID, clock ID, clock quality attribute(s), security attribute(s), and/or permitted role(s) associated with the first device 402. In the illustrative example, the administrator 404 adds a clock ID associated with the first device 402 to a list of permitted clock IDs. In some examples, the administrator 404 may add the first device 402 to the list of permitted clock IDs, where the first device 402 comprises a legacy device that does not have the capability of authorizing with the controller 106 (e.g., a non-PTP aware device).

At 420, the controller 106 updates the list(s) (e.g., policy pool) of permitted network devices in response to the input from the administrator 404. In some examples, the controller 106 may update one or more of a policy, clock quality threshold, and/or list of permitted device(s) and/or role(s) associated with the permitted network device(s) in response to the input from the administrator 404. For instance, in some examples, the controller 106 may remove a network device from the list of permitted network devices and/or remove a permitted role associated with the network device in response to the input from the administrator 404.

At 422, the second device 114 receives a re-authorization request from the controller 106. In some examples, the controller 106 may send the re-authorization request in response to the administrator 404 adding the first device 402. In some examples, the controller 106 may send re-authorization requests to all network devices that are authenticated and/or authorized with the controller 106. In some examples, such as where the administrator 404 inputs a policy change, the re-authorization request may comprise an indication of the policy change.

At 424, the controller 106 receives an authentication and authorization request from the second device 114. As noted above, the authentication and authorization request may comprise the client ID, clock ID, and/or clock quality attribute(s) associated with the first device 402. In some examples and as described above, the authentication and authorization request may comprise a TLV. In some examples, the authentication and authorization request may comprise a client ID and/or additional attribute(s) (clock quality, security, etc.) associated with the second device 114.

At 426, the controller 106 runs (e.g., executes) the controller algorithm. The controller algorithm is described in greater detail below with regard to FIG. 6. In the illustrative example, the controller 106 does not check for authentication of the first device 402. Based at least in part on running the controller algorithm, the controller 106 may determine that the first device 402 is authorized to act as a grandmaster within the service network 102.

At 428, the second device 114 receives a message from the controller 106 granting authorization for the second device 114 to synchronize with the clock of the first device 402. As described above, in response to receiving the grant of authorization message, the second device 114 may initiate the BMCA. Additionally, the second device 114 may set it's PortState to "SLAVE." Thus, by implementing a controller 106 within a PTP system, administrators 404 of the service network 102 may have more control over which nodes act as masters and under what circumstances.

Figure 5A:
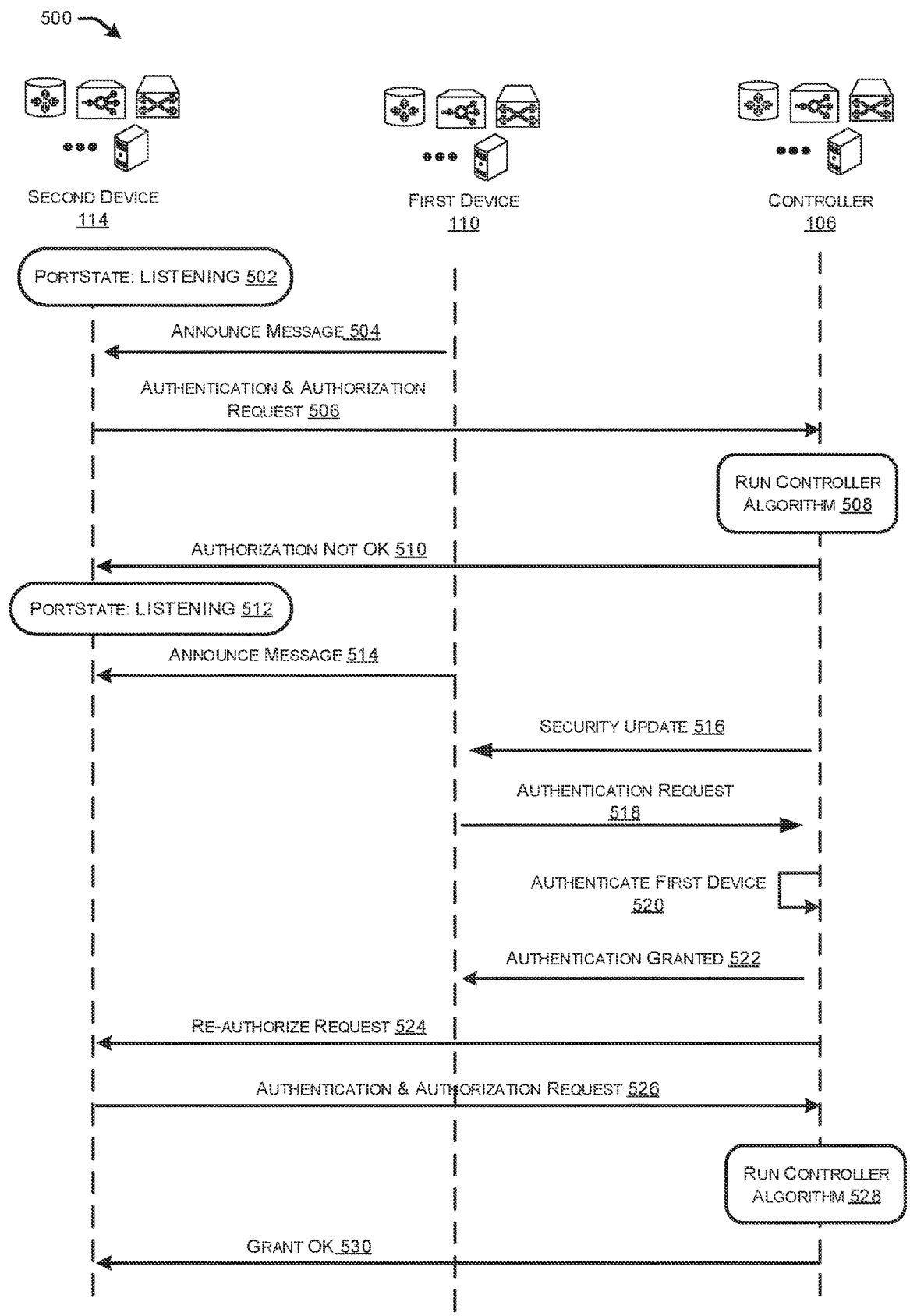
FIGS. 5A and 5B illustrate a flow diagram of example communications where the controller re-authorizes a network device and grants authorization to synchronize clocks between network devices in response to a security update.
Figure 5B:
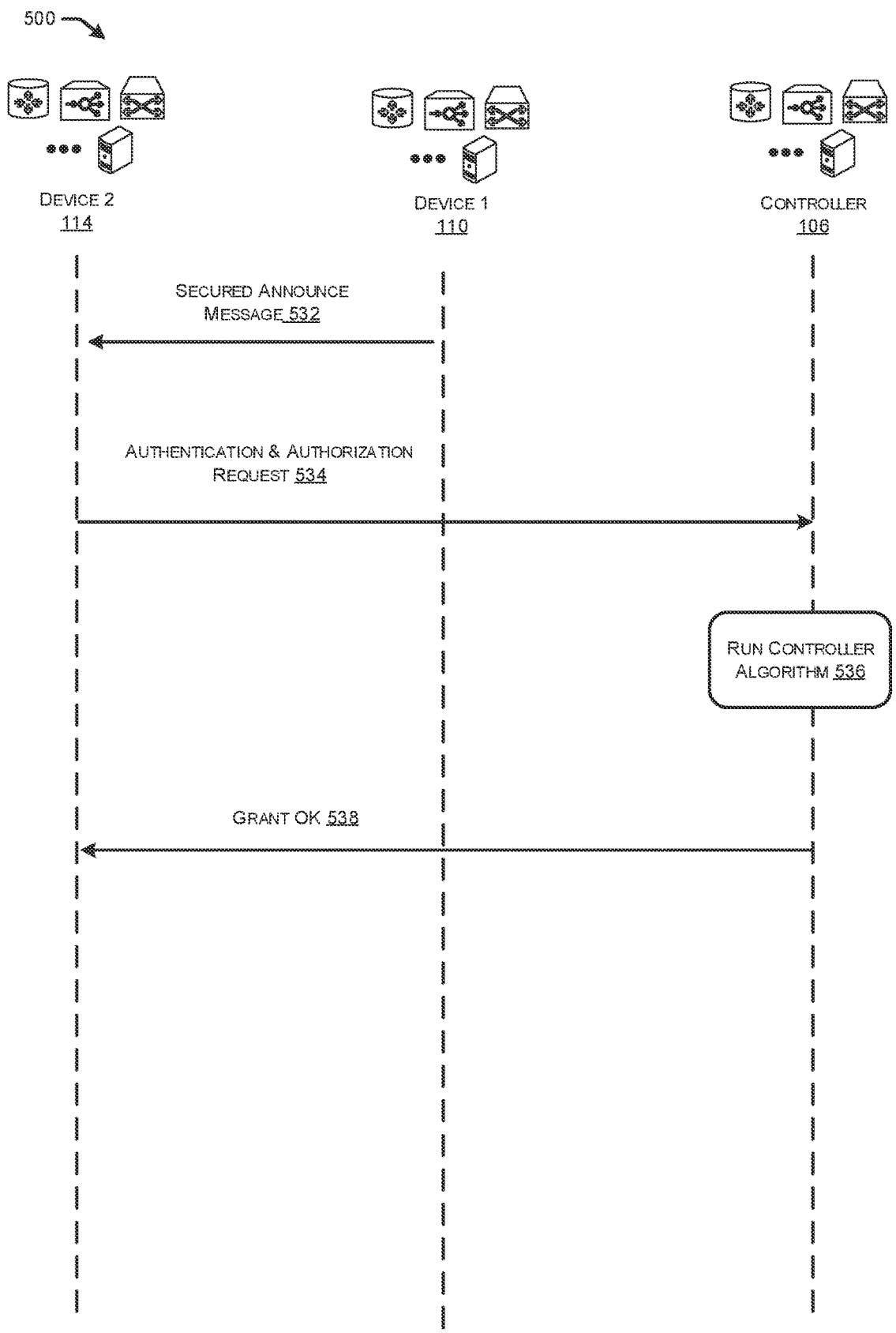

FIGS. 5A and 5B illustrate a flow diagram of an example communication session 500 for re-authorizing a network device in response to a security update. As illustrated, the controller 106 may communicate with a first device 110 and second device 114, as described above. In the illustrative example, the second device 114 may comprise a PTP aware device that is authenticated by the controller 106 using the techniques described above. In some examples, the first device 110 may comprise a PTP aware device that is not authenticated by the controller 106. In the illustrative example, the first device 110 comprises a network device that is initially PTP unaware and, in response to a software update, is configured to be PTP aware.

At 502, the second device 114 sets it's PortState to "LISTENING." As noted above, in "listening" mode, the port of the second device 114 is waiting for a connection to be formed and is "listening" for an announce message from another device.

At 504, the second device 114 receives an announce message from the first device 110. As described above, the announce message may comprise a client ID and/or clock ID associated with the first device 110 and attribute(s) (e.g., clock quality attributes, security attributes, etc.) associated with the first device 110.

At 506, the controller 106 receives an authentication and authorization request from the second device 114. As noted above, the authentication and authorization request may comprise the client ID, clock ID, clock quality attribute(s), and/or other attributes associated with the first device 110. In some examples and as described above, the authentication and authorization request may comprise a client ID, clock ID, and/or additional attribute(s) (clock quality, security, etc.) associated with the second device 114.

At 508, the controller 106 runs (e.g., executes) the controller algorithm. The controller algorithm is described in greater detail below with regard to FIG. 6. Based at least in part on running the controller algorithm, the controller 106 may determine that the first device 110 is not authenticated and/or is not authorized to act as a grandmaster within the service network 102.

At 510, the second device 114 receives a message from the controller 106. The message may comprise an indication that the first device 110 is not authenticated and/or that authorization for the second device 114 to synchronize clocks with the first device 110 is denied.

At 512, the second device 114 maintains it's PortState as "LISTENING." As noted above, in "listening" mode, the port of the second device 114 is waiting for a connection to be formed and is "listening" for an announce message from another device. As noted above, the second device 114 may maintain a list of non-authorized master and/or grandmasters 110. For instance, in response to receiving the denial of authorization message from the controller 106 at 510, the second device 114 may update the list of non-authorized masters and/or grandmasters to include the clock ID and/or client ID of the first device 110. Accordingly, when the second device 114 receives any subsequent announce message from the first device 110, the second device 114 may ignore the announce message.

At 514, the second device 114 receives an announce message from the first device 110. As described above, the announce message may comprise a client ID and/or clock ID associated with the first device 110 and attribute(s) (e.g., clock quality attributes, security attributes, etc.) associated with the first device 110. As noted above, the second device 114 may ignore the announce message based on receiving the denial of authorization message from the controller 106 at 510. For instance, the second device 114 may maintain a list of non-authorized master and/or grandmasters 110. When the second device 114 receives an announce message from a master and/or grandmaster included in the list, the second device 114 may ignore the announce message.

At 516, the first device 110 may receive a security update from the controller 106. In some examples, the security update enables that the first device 110 to authenticate with the controller 106. In response to the security update, the first device 110 may send the controller 106 an authentication request. While step 516 is illustrated as the first device 110 receiving a security update from the controller 106, it is understood that the security update may be received from any network device. Additionally or alternatively, an administrator 404 or other user may enable a security feature on the first device 110, such that the first device 110 is configured to be PTP aware and may authenticate with the controller 106.

At 518, the controller 106 receives an authentication request from the first device 110. As described above, the authentication request may be sent via a secured communication channel, such as a TLS tunnel. In some examples, the authentication request is embedded in a TLV of any interior or exterior gateway protocols. The authentication request may comprise a client ID and/or clock ID associated with the first device 110, a requested role (e.g., grandmaster 110), clock quality attributes associated with the first device 110, and/or other attributes associated with the first device 110. The attributes may further comprise security attributes associated with the first device 110.

At 520, the controller 106 authenticates the first device 110. For instance, as noted above, the controller 106 may access a list of devices permitted to act as grandmasters within the service network. In some examples, the controller 106 may authenticate the first device 110 based on accessing a list of roles the first device 110 is authorized to perform. Additionally or alternatively, the controller 106 may authenticate the first device 110 based on evaluating a security posture of the first device 110. For instance, the controller 106 may check that the security posture of the first device 110 meets the requirements to be a grandmaster. In some examples, such as where the security posture of the first device 110 meets the requirements of a grandmaster, the controller 106 may grant authentication. In response, the controller 106 may store the client ID and/or clock ID, role as grandmaster, and security attributes associated with the first device 110.

At 522, the first device 110 receives a message from the controller 106. The message may indicate that authentication has been granted designating the first device 110 as a grandmaster. In some examples, the grant of authentication message is sent to the first device 110 via a secured communication channel, such as a TLS tunnel. In some examples, the response from the controller 106 may be based on the request type (e.g., TLS versus gateway protocol(s)). In some examples, the grant of authentication message comprises a private key, as described above.

At 524, the second device 114 receives a re-authorization request from the controller 106. In some examples, the controller 106 may send the re-authorization request in response to a software update on the first device 110 that enables the first device 110 to authenticate with the controller 106. In some examples, the controller 106 may send re-authorization requests to all network devices that are authenticated and/or authorized with the controller 106. In some examples, the re-authorization request does not comprise the clock ID of the first device 110.

At 526, the controller 106 receives an authentication and authorization request from the second device 114. As noted above, the authentication and authorization request may comprise the client ID, clock FD, and/or clock quality attribute(s) associated with the first device 110. In some examples and as described above, the authentication and authorization request may comprise a TLV. In some examples, the authentication and authorization request may comprise a client ID and/or additional attribute(s) (clock quality, security, etc.) associated with the second device 114. In some examples, the controller 106 may receive a plurality of authentication and authorization requests from the second device 114, where the plurality of authentication and authorization requests are associated with network device(s) the second device 114 has received announce messages from.

At 528, the controller 106 runs (e.g., executes) the controller algorithm. The controller algorithm is described in greater detail below with regard to FIG. 6. Based at least in part on running the controller algorithm, the controller 106 may determine that the first device 110 is authenticated and is authorized to act as a grandmaster within the service network 102.

At 530, the second device 114 receives a message from the controller 106 granting authorization for the second device 114 to synchronize with the clock of the first device 110. As noted above, the second device 114 may maintain a list of non-authorized master and/or grandmasters 110. In the illustrative example, the second device 114 may update the list of non-authorized master and/or grandmaster devices, such that the first device 110 is no longer included on the list.

As illustrated in FIG. 5B, at 532, the second device 114 receives a secured announce message from the first device 110. As described above, the announce message may be sent via a secured channel, and may comprise a client ID and/or clock ID associated with the first device 110 and attribute(s) (e.g., clock quality attributes, security attributes, etc.) associated with the first device 110. In some examples, the announce message may comprise a TLV, as described above.

At 534, the controller 106 receives an authentication and authorization request from the second device 114. In some examples, the second device 114 may periodically validate the authenticity of the first device's 110 authenticity with the controller 106. Accordingly, the controller 106 may receive authentication and authorization requests from the second device 114 in response to determining a time interval has elapsed. As noted above, the authentication and authorization request may comprise the client ID, clock ID, and/or clock quality attribute(s) associated with the first device 110. In some examples and as described above, the authentication and authorization request may comprise a TLV. In some examples, the authentication and authorization request may comprise a client ID and/or additional attribute(s) (clock quality, security, etc.) associated with the second device 114.

At 536, the controller 106 runs (e.g., executes) the controller algorithm. The controller algorithm is described in greater detail below with regard to FIG. 6. Based at least in part on running the controller algorithm, the controller 106 may determine that the first device 110 is authenticated and is authorized to act as a grandmaster within the service network 102.

At 538, the second device 114 receives a message from the controller 106 granting authorization for the second device 114 to synchronize with the clock of the first device 110.

Figure 6:
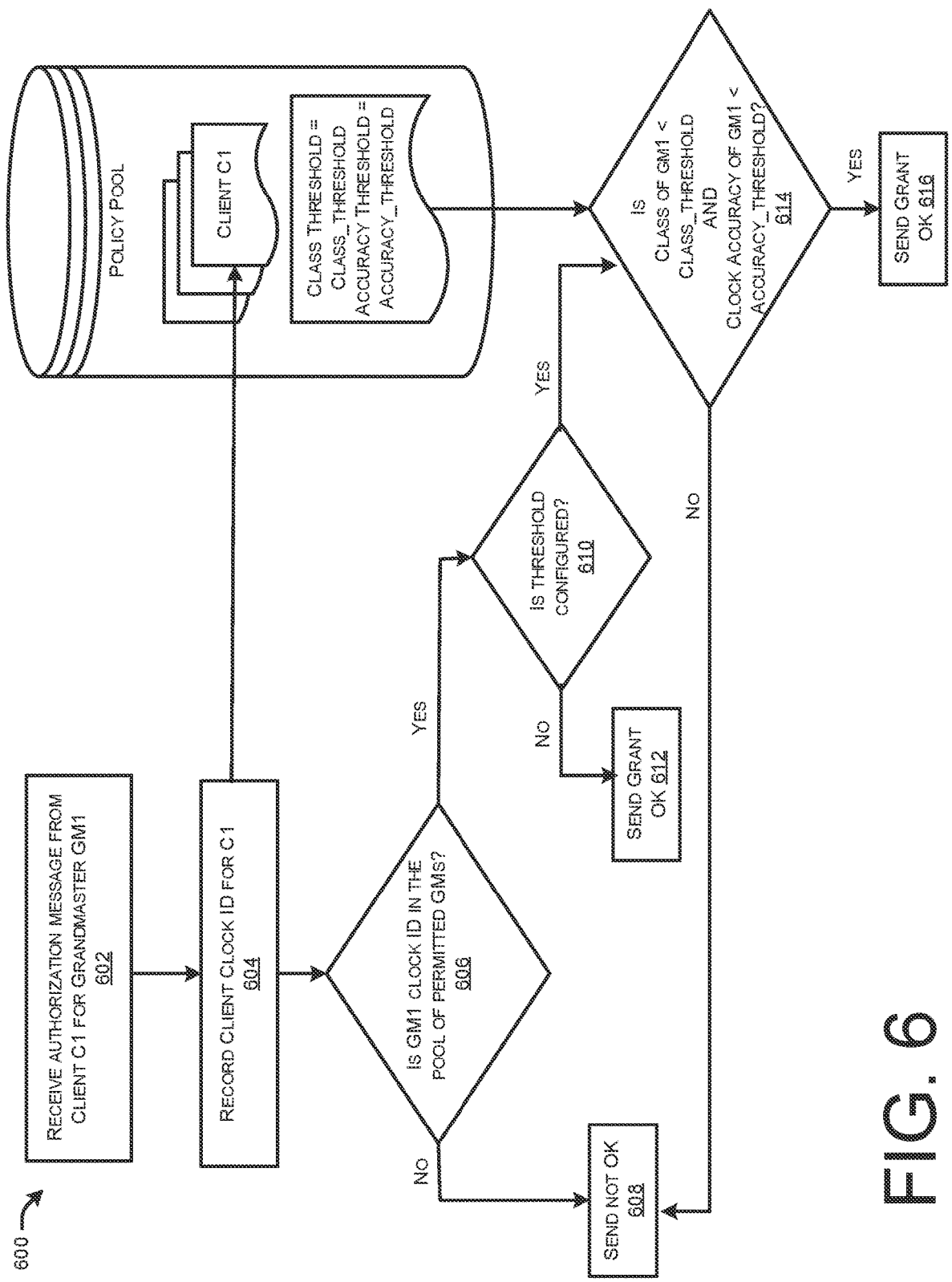
FIG. 6 illustrates a flow diagram of an example algorithm executed by the controller to authenticate and/or authorize a network device.

FIG. 6 illustrates a flow diagram of an example controller algorithm 600 executed by the controller 106 to authenticate and/or authorize a network device. In some examples and as noted above, the controller 106 may execute (e.g., run), the controller algorithm in response to receiving an authentication request from one or more PTP aware network device(s). In the illustrative example, the controller 106 is executing the controller algorithm in response to receiving an authentication and authorization request from a slave device (e.g., second device 114) for a grandmaster (e.g., first device 110, 302, 402, etc.).

At 602, the controller 106 may receive an authentication and authorization request from a client device (illustrate as client C1, such as slave device(s) 114 described above) for a grandmaster 110. As noted above, the authentication and authorization request may comprise the client ID, clock ID, and/or clock quality attribute(s) associated with the grandmaster 110. In some examples, the authentication and authorization request may comprise a client ID and/or additional attribute(s)(clock quality, security, etc.) associated with the slave device 114. In some examples and as described above, the authentication and authorization request may comprise a TLV, which may include a private key associated with an authenticated grandmaster.

At 604, the controller 106 may, in response to receiving the authentication and authorization request, record the client ID and/or clock ID of the second device 114. For instance, the controller 106 may maintain a policy pool. The policy pool may contain list(s) indicating authenticated client network devices, role(s) permitted for each authenticated client device, clock quality attribute(s) associated with each client network device, security attribute(s) associated with each client network device, etc. In some examples, the policy pool may contain one or more clock quality thresholds associated with one or more clock quality attributes (e.g., clock accuracy, clock class, etc.), that may be pre-set and/or preconfigured by an administrator of the service network 102. In the illustrative example, the controller 106 records the clock ID associated with the client device in order to indicate that the client device is within the service network 102.

At 606, the controller 106 may determine whether the clock ID associated with the grandmaster 110 is included in a list of clock ID's associated with network devices that are permitted to act as grandmasters within the service network 102. As noted above, the controller 106 may maintain the list of permitted grandmasters and/or may access the list from the policy pool based at least in part on the clock ID of the grandmaster. In some examples, the clock ID of the grandmaster 110 is included as part of the signature in the TLV of the authentication and authorization message received by the controller 106. As noted above, the signature may be generated by the grandmaster 110 using the private key sent from the controller 106. Accordingly, the controller 106 may access a public key associated with private key to decrypt the signature and determine whether the grandmaster 110 is an authenticated device (e.g., included in a list of permitted grandmasters). In other examples and as described above, the client device 114 may decrypt the TLV using a public key from the controller 106, and may include the clock ID of the grandmaster 110 in the authentication and authorization request to the controller 106.

At 608, the controller 106 determines that the clock ID of the grandmaster 110 is not included in the list of permitted grandmaster network devices. In response to the determination, the controller 106 may send a denial of authorization message to the client device 114 as described above.

At 610, the controller 106 determines the clock ID of the grandmaster is included in the list of permitted grandmasters. In response, the controller 106 may determine whether one or more clock quality thresholds are configured. For instance, as noted above, an administrator may configure threshold(s), which may allow network devices act in certain roles (e.g., slave, master, grandmaster) if the threshold(s) are met. In some examples, the threshold(s) may be clock quality thresholds that are based on clock quality attributes associated with the network devices. In the illustrative example, the threshold(s) correspond to clock quality threshold(s), comprising a class threshold (e.g., class_threshold) and a clock accuracy threshold (e.g., accuracy_threshold). In some examples, the clock quality threshold(s) may be configured based on a role being requested by a network device. For instance, the clock quality threshold(s) required to become a grandmaster in the service network 102 may be lower than the threshold(s) required to become a master and/or slave. The threshold(s) may indicate a minimum quality of clock associated with the grandmaster in order to synchronize with the clock of the grandmaster. For instance, the clock class may indicate a quality of the clock, where lower clock class values indicate a higher quality clock (e.g., time source) as specified in IEEE 1588v2. The clock accuracy may indicate how accurate a network device(s) clock (e.g., time source) is, which lower clock accuracy values indicating a more accurate clock. Additionally, or alternatively, one or more additional threshold(s) may be associated with security attributes. In this example, the additional threshold(s) may be used to evaluate a security posture of the grandmaster 110, as described above.

At 612, the controller 106 determines that no threshold(s) have been configured and/or pre-set. In response, the controller 106 may send a grant of authorization message to the client device 114, as described above.

At 614, the controller 106 determines that threshold(s) are configured. In response, the controller 106 may determine whether the clock quality attribute(s) and/or security attribute(s) meet the threshold(s) (e.g., clock quality threshold(s) and/or additional threshold(s)) associated with being a grandmaster 110. In the illustrative example, the controller 110 determines whether a clock class value associated with the grandmaster 110 is less than the class threshold value. Additionally or alternatively, the controller 106 may determine whether the clock accuracy associated with the grandmaster is less than the accuracy threshold. In this example, if the controller 106 determines that either threshold is not met (e.g., class threshold or accuracy threshold), the controller 106 may send a denial of authorization message to the client device 114 as described above.

At 616, the controller 106 determines that the threshold(s) have been met by the grandmaster 110. In the illustrative example, the controller 106 determines that both the clock accuracy threshold and the clock class threshold have been met by the grandmaster 110. In response, the controller 106 may send a grant of authorization message to the client device 114, as described above. The client device 114 may then initiate the BMCA, as described above.

Figure 7:
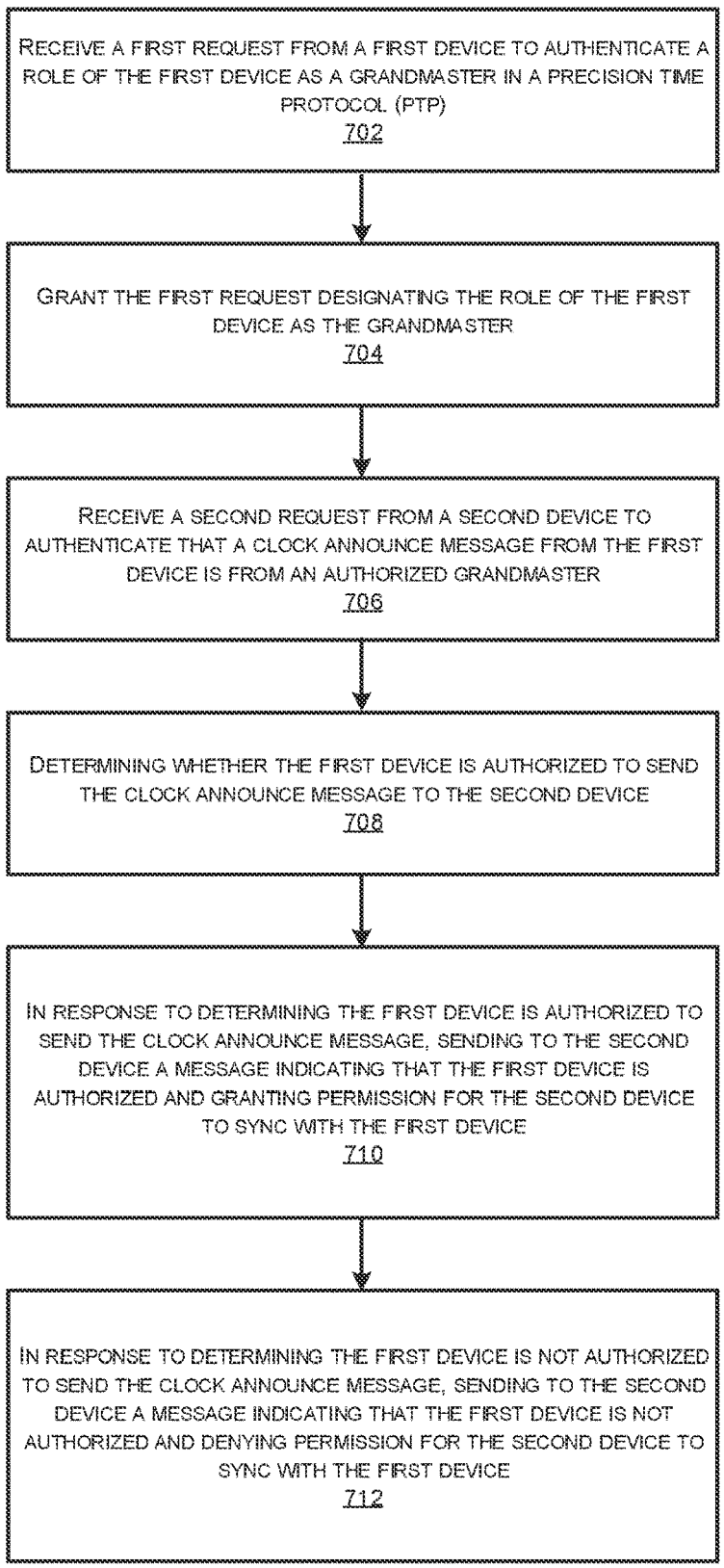
FIG. 7 illustrates a flow diagram of an example method for a system to authenticate and authorize clock synchronization between network devices.

FIG. 7 a flow diagram of an example method 700 for a system to authenticate and authorize clock synchronization between network devices. In some instances, the steps of method 700 may be performed by a device (e.g., controller 106) that includes one or more processors and one or more non-transitory computer-readable media storing computer-executable instructions that, when executed by the one or more processors, cause the one or more processors to perform operations of method 700.

At 702, the controller 106 may receive a first request from a first device to authenticate a role of the first device as a grandmaster in a precision time protocol (PTP). For instance, the first request may comprise an authentication request, as described above. For instance, the first request may comprise a client ID, a clock ID, a requested role, clock quality attributes, and/or other attribute(s) associated with the first device.

At 704, the controller 106 may grant the first request designating the role of the first device as the grandmaster. For instance, as described above, the controller 106 may authenticate the first device based at least in part on determining that the clock ID of the first device is included in a pool of permitted device IDs (e.g., such as the list of permitted devices described above) and authenticating that the role of grandmaster is a permitted role associated with the clock ID of the first device. In some examples, authenticating the first device as a grandmaster may comprise executing the controller algorithm described above. For instance, the controller 106 may analyze at least clock quality attributes associated with the first device, the clock quality attributes including at least one of a clock accuracy or a clock class and determine that at least one of the clock accuracy or the clock class satisfies a clock quality threshold, where at least one clock quality threshold is configured. As described above, granting authentication of the first device may comprise sending a grant of authentication message, which may comprise a private key.

As described above, the controller 106 may receive additional authentication request(s) from additional network device(s). The additional authentication request(s) may indicate that one or more of the additional network device(s) are requesting a role as a slave in the PTP. The controller 106 may authenticate the one or more additional network device(s) and designate the one or more additional network device(s) as slave(s) in the PTP using the techniques described above.

At 706, the controller 106 may receive a second request from a second device to authenticate that a clock announce message from the first device is from an authorized grandmaster. For instance, as noted above, the second request may comprise an authentication and authorization request from the second device.

At 708, the controller 106 may determine whether the first device is authorized to send the clock announce message to the second device. For instance, the controller 106 may determine whether the first device is authenticated and authorized based on executing the controller algorithm described above.

At 710, the controller 106 may, in response to determining that the first device is authorized to send the clock announce message, send to the second device a message indicating that the first device is authorized and granting permission for the second device to synchronize with the first device. For instance, the message may comprise a grant of authorization message as described above.

At 712, the controller 106 may, in response to determining that the first device is not authorized to send the clock announce message, send to the second device a message indicating that the first device is not authorized and denying permission for the second device to synchronize with the first device. For instance, the message may comprise a denial of authorization message as described above.

Figure 8:
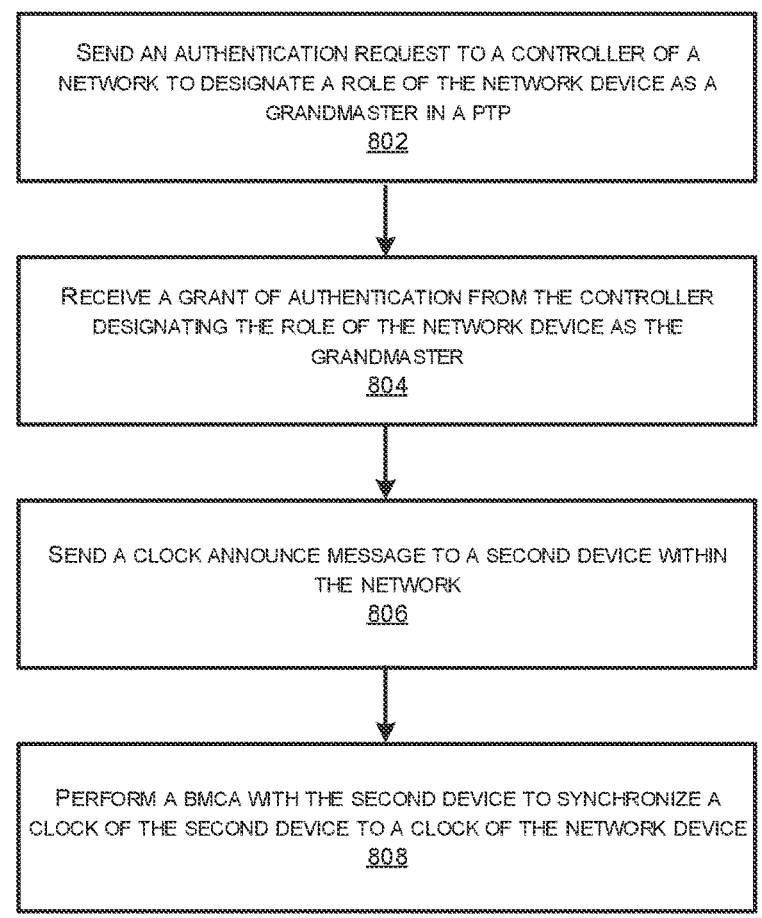
FIG. 8 illustrates a flow diagram of an example method for a network device to authenticate with a controller and synchronize clocks with other network devices.

FIG. 8 illustrates a flow diagram of an example method 800 for a network device to authenticate with a controller and synchronize clocks with other network devices. In some instances, the techniques may be performed by a system (e.g., one or more network devices), such as the grandmaster network device 110, a server, a combination thereof, and/or any other devices (e.g., hardware offload chips and/or any other device). The techniques of method 800 may be performed by a system that includes one processor, or more than one processor.

At 802, the network device may send an authentication request to a controller of a network to designate a role of the network device as a grandmaster in a PTP. For instance, as described above, the authentication request may comprise a clock ID, client ID, clock quality attribute(s), and/or other attributes associated with the network device, etc. As noted above, the network device may comprise a PTP aware device.

At 804, the network device may receive a grant of authentication from the controller designating the role of the network device as the grandmaster. For instance, as noted above, the grant of authentication message may comprise a private key.

At 806, the network device may send a clock announce message to a second device within the network. For instance, the clock announce message may comprise a TLV. In some examples and as noted above, the TLV may comprise a proof of integrity indicating that the network device is authenticated to act as the grandmaster. For instance, the TLV may comprise a signature encrypted using the private key. In some examples, the network device may send one or more additional clock announce messages to one or more additional devices within the service network 102.

As noted above, the second device may send an authentication and authorization request to the controller 106. In some examples, the controller 106 may authenticate and authorize the first device based on executing the controller algorithm. The second device may receive a grant of authorization message from the controller as described above.

At 808, the network device may perform a BMCA with the second device to synchronize a clock of the second device to a clock of the network device. In some examples, the network device may perform the BMCA with one or more additional devices, to synchronize the clocks of the one or more additional devices to the clock of the network device.

Figure 9:
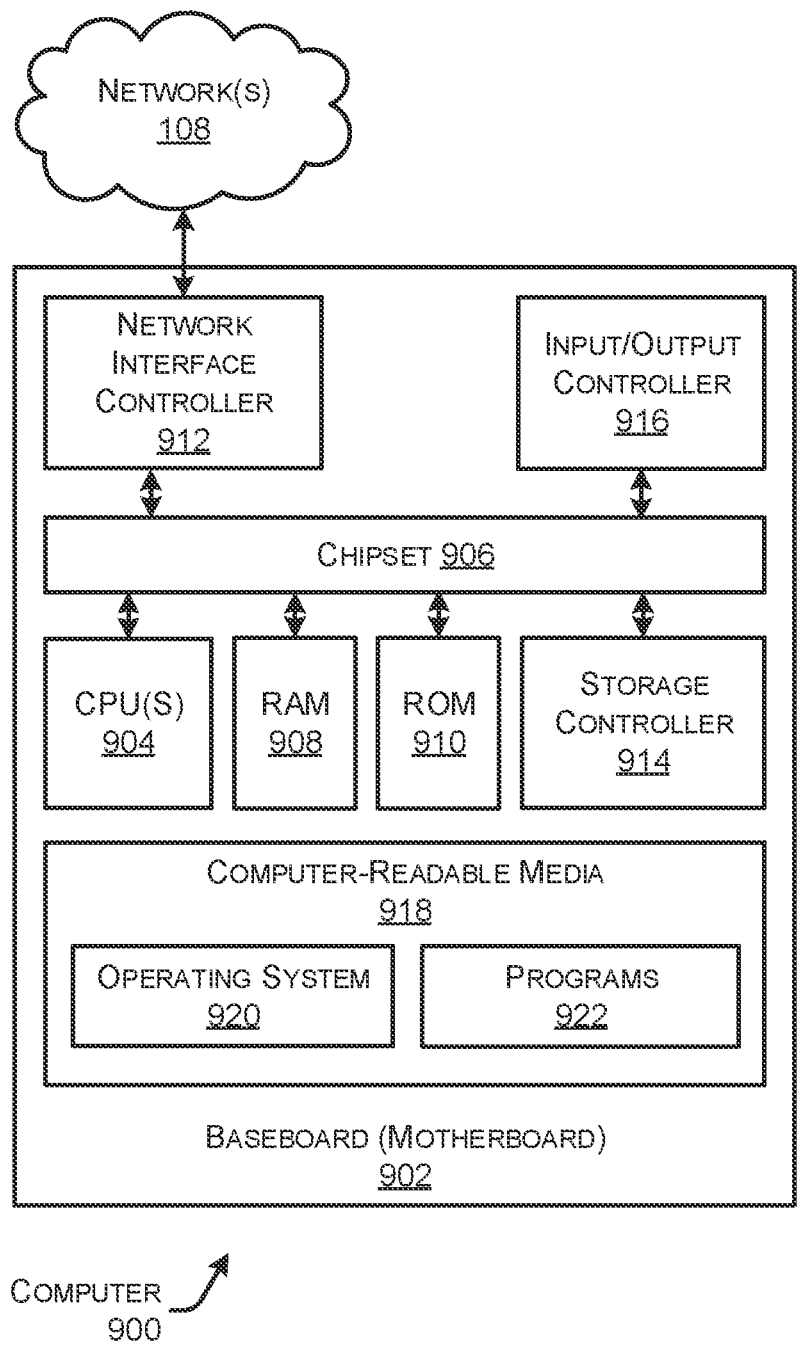
FIG. 9 is a computer architecture diagram showing an illustrative computer hardware architecture for implementing a server device that can be utilized to implement aspects of the various technologies presented herein.

FIG. 9 shows an example computer architecture for a device capable of executing program components for implementing the functionality described above. The computer architecture shown in FIG. 9 illustrates any type of computer 900, such as a conventional server computer, workstation, desktop computer, laptop, tablet, network appliance, e-reader, smartphone, or other computing device, and can be utilized to execute any of the software components presented herein. The computer may, in some examples, correspond to a controller 106, a grandmaster network device 110, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as networks(s) 108. The chipset 906 can include functionality for providing network connectivity through a NIC 912, such as a gigabit Ethernet adapter. The NIC 912 is capable of connecting the computer 900 to other computing devices over the network 108. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the controller 106, the grandmaster network device 110, and/or any components included therein, may be supported by one or more devices similar to computer 900. Stated otherwise, some or all of the operations performed by controller 106, grandmaster network device 110, and or any components included therein, may be performed by one or more computer devices 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-8. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of by a controller 106, a grandmaster network device 110, and/or any other device. The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein as being performed by the controller 106, the grandmaster network device 110, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for monitoring and authorizing clock synchronization between devices of a network. For instance, the programs 922 may cause the computer 900 to perform techniques for monitoring clock synchronization within the network, including: receiving a first request from a first device to authenticate a role of the first device as a grandmaster in a precision time protocol (PTP), granting the first request designating the role of the first device as the grandmaster, receiving a second request from a second device to authenticate that a clock announce message from the first device is from an authorized grandmaster, determining whether the first device is authorized to send the clock announce message to the second device, and in response to determining the first device is authorized to send the clock announce message, sending to the second device a message indicating that the first device is authorized as the grandmaster and granting permission for the second device to sync with the first device, or in response to determining that the first device is not authorized to perform the clock announce message, sending to the second device, a message indicating that the first device is not authorized as the grandmaster and denying permission for the second device to sync with the first device. In this way, controllers within a service network can not only manage clock synchronization between devices within the network, but may authenticate that devices within the network are trustworthy time sources. By ensuring that the time source is secure, the techniques described herein improve network security, prevent rogue master attacks, thereby reducing harm to the network and applications that rely on the time source of a grandmaster within the network. Additionally, the programs 922 may comprise instructions that cause the computer 900 to perform the specific techniques for authenticating a network device with a controller of the network and synchronizing clocks with other devices within the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a controller that monitors devices within a network, the method comprising:
    receiving a first request from a first device to authenticate a role of the first device as a grandmaster in a precision time protocol (PTP);
    granting the first request designating the role of the first device as the grandmaster;
    receiving a second request from a second device to authenticate that a clock announce message from the first device is from an authorized grandmaster;
    determining whether the first device is authorized to send the clock announce message to the second device; and
    in response to determining the first device is authorized to send the clock announce message, sending to the second device a message indicating that the first device is authorized as the grandmaster and granting permission for the second device to sync with the first device; or
    in response to determining that the first device is not authorized to perform the clock announce message, sending to the second device, a message indicating that the first device is not authorized as the grandmaster and denying permission for the second device to sync with the first device.

2. The method of claim 1, wherein the first request comprises a clock ID of the first device.

3. The method of claim 2, wherein granting the first request designating the role of the first device as the grandmaster further comprises:
determining that the clock ID of the first device is included in a pool of permitted device IDs; and
authenticating that the role of the grandmaster is a permitted role associated with the clock ID of the first device.

4. The method of claim 1, wherein granting the first request designating the role of the first device as the grandmaster further comprises:
analyzing clock quality attributes associated with the first device, the clock quality attributes including at least one of a clock accuracy or a clock class; and
determining that at least one of the clock accuracy or the clock class satisfies a clock quality threshold.

5. The method of claim 1, further comprising:
receiving a third request from the second device to authenticate a role of the second device as a slave in the PTP; and
granting the third request designating the role of the second device as the slave.

6. The method of claim 1, wherein granting the first request further comprises:
providing the first device with a key in response to authenticating the role of the first device as the grandmaster, the key comprising a private key.

7. The method of claim 6, wherein the second request from the second device includes the key.

8. The method of claim 1, further comprising:
receiving, from the second device and after a threshold period of time has elapsed, an authentication and authorization request to validate authenticity and authorization of the first device to act as the grandmaster;
determining whether the first device is authenticated and authorized to act as the grandmaster; and
in response to determining the first device is authenticated to act as the grandmaster, sending to the second device a second message indicating that the first device is authorized to act as the grandmaster and permitting the second device to continue syncing with the first device; or
in response to determining that the first device is not authenticated or not authorized to act as the grandmaster, sending to the second device, a second message indicating that the first device is not authorized and denying permission for the second device to continue syncing with the first device.

9. A system comprising:
one or more processors; and
one or more non-transitory computer-readable media storing computer-executable instructions that, when executed by the one or more processors, cause the one or more processors to perform operations comprising:
receiving a first request from a first device to authenticate a role of the first device as a grandmaster in a PTP;
granting the first request designating the role of the first device as the grandmaster;
receiving a second request from a second device to authenticate that a clock announce message from the first device is from an authorized grandmaster;
determining whether the first device is authorized to send the clock announce message to the second device; and
in response to determining the first device is authorized to send the clock announce message, sending to the second device a message indicating that the first device is authorized as the grandmaster and granting permission for the second device to sync with the first device; or
in response to determining that the first device is not authorized to perform the clock announce message, sending to the second device, a message indicating that the first device is not authorized as the grandmaster and denying permission for the second device to sync with the first device.

10. The system of claim 9, wherein the first request comprises a clock ID of the first device.

11. The system of claim 10, wherein granting the first request designating the role of the first device as the grandmaster further comprises:
determining that the clock ID of the first device is included in a pool of permitted device IDs; and
authenticating that the role of grandmaster is a permitted role associated with the clock ID of the first device.

12. The system of claim 9, wherein granting the first request designating the role of the first device as the grandmaster further comprises:
analyzing clock quality attributes associated with the first device, the clock quality attributes including at least one of a clock accuracy or a clock class; and
determining that at least one of the clock accuracy or the clock class satisfies a clock quality threshold.

13. The system of claim 9, the operations further comprising:
receiving a third request from the second device to authenticate a role of the second device as a slave in the PTP; and
granting the third request designating the role of the second device as the slave.

14. The system of claim 9, wherein granting the first request further comprises:
providing the first device with a key in response to authenticating the role of the first device as the grandmaster, the key comprising a private key.

15. The system of claim 14, wherein the second request from the second device includes the key.

16. The system of claim 9, further comprising:
receiving, from the second device and after a threshold period of time has elapsed, an authentication and authorization request to validate authenticity and authorization of the first device to act as the grandmaster;
determining whether the first device is authenticated and authorized to act as the grandmaster; and
in response to determining the first device is authenticated to act as the grandmaster, sending to the second device a second message indicating that the first device is authorized to act as the grandmaster and permitting the second device to continue syncing with the first device; or
in response to determining that the first device is not authenticated or not authorized to act as the grandmaster, sending to the second device, a second message indicating that the first device is not authorized and denying permission for the second device to continue syncing with the first device.

17. A network device comprising:
one or more processors; and
one or more non-transitory computer-readable media storing computer-executable instructions that, when executed by the one or more processors, cause the one or more processors to perform operations comprising:
sending an authentication request to a controller of a network to designate a role of the network device as a grandmaster in a precision time protocol (PTP);

receiving a grant of authentication from the controller designating the role of the network device as the grandmaster, wherein the grant of authentication comprises a private key;

sending a secured clock announce message to a second device within the network; and performing a best master clock algorithm (BMCA) with the second device to synchronize a clock of the second device with a clock of the network device.

18. The network device of claim 17, wherein the secured clock announce message comprises a tag-length-value (TLV), the TLV comprising a proof of integrity that the network device is authenticated to act as the grandmaster.

19. The network device of claim 18, wherein the proof of integrity comprises a signature encrypted using the private key.

20. The network device of claim 17, wherein the secured clock announce message comprises the private key.

\* \* \* \* \*